May 15, 1951   J. BOUCHER   2,553,234
CONDITIONING PLANT FOR MOLDING SAND
Filed July 2, 1948
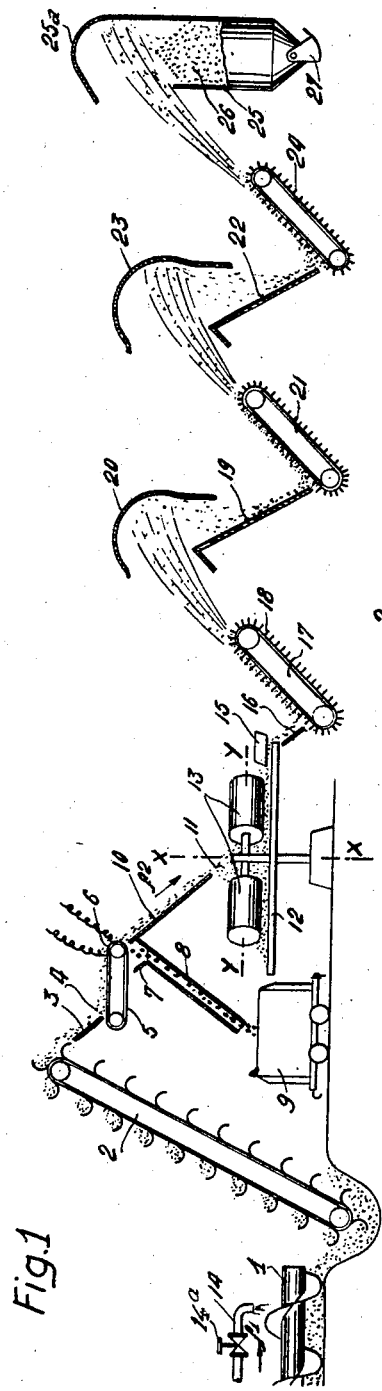
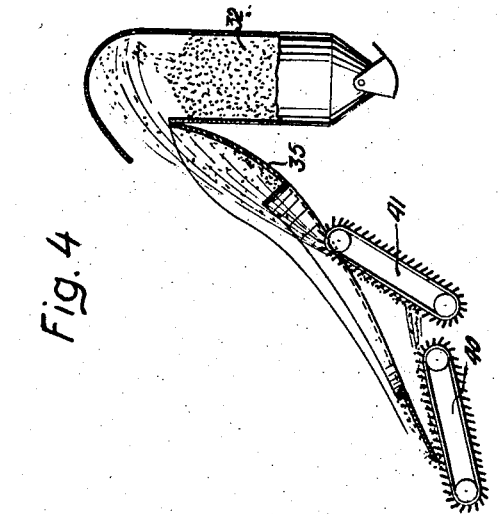
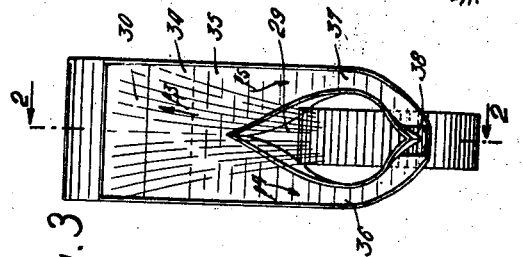
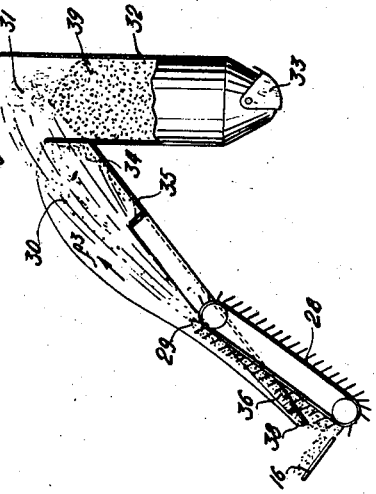
INVENTOR
JACQUES BOUCHER
BY Richardson and David
HIS ATTY's Patented May 15, 1951

2,553,234

UNITED STATES PATENT OFFICE 2,553,234

CONDITIONING PLANT FOR MOLDING SAND

Jacques Boucher, Paris, France, assignor to Pompes Noel, Liverdun, France, a French company Application July 2, 1948, Serial No. 36,789
In France August 1, 1946

4 Claims. (Cl. 22—89)

The invention relates to a plant for conditioning moulding sand.

It is well known that moulding sand can be used over several times provided that, after each time it is used, it undergoes the following operations: crushing, breaking up, cooling, dampening and, if necessary, enriching with a binder.

Up to now this treatment has always required a rather long time, especially for the cooling and moistening to penetrate to the core of the sand. For this reason, all large sand processing works must have a large reserve of sand. This has many drawbacks, mainly the following:

The necessity to prepare a large quantity of sand, and difficulty in rectifying the composition thereof according to manufacturing needs;

The necessity for large sized bins, therefore of bulky dimensions;

The need for raising the sand to the top of the bins with the help of special elevators entailing a huge consumption of power.

The present invention has for its object to provide an improved conditioning plant for moulding sand and similar materials, in order to avoid said drawbacks.

The invention has more especially for its object to provide a plant wherein the sand or other material at the beginning of the conditioning thereof is brought down to a sufficiently low temperature, and to a sufficiently consistent degree of dampness so as to be immediately reused, without necessarily remaining in a cooling and stabilizing bin. The quantity of sand necessary may therefore be very greatly reduced.

Said plant comprises means allowing the sand, or other material, to undergo several continuous and simultaneous operations of breaking up, mixing and cooling between the reception station for used material and the utilization station of the regenerated material.

Other features and advantages will be evident from the following description.

On the accompanying drawing, given merely by way of example:

Fig. 1 is a diagrammatic elevational view of a plant according to the invention;

Fig. 2 is a vertical section along line 2—2 of Fig. 3, of another embodiment;

Fig. 3 is a corresponding front view;

Fig. 4 is an elevational view of another embodiment.

According to the embodiment shown in Fig. 1, the used sand of a reception station is brought by a spiral conveyor 1 moving according to arrow $f^1$ up to the base of a bucket elevator 2 which hoists it up and empties it in a small chute 3. The sand then falls in 4 on a conveyor belt winding around a magnetic drum 6. The metallic particles are retained by said drum 6 and fall in 7 into a chute 8 which discharges them in truck 9.

The sand, cleared of its metallic particles, flows according to arrow $f^2$ into a hopper 10 and falls into 11 in the centre of a round table 12, rotated with a uniform speed around its axis XX. Two crushing rollers 13, movable around a horizontal stationary axis YY, are rotated by the circular motion of table 12. A pipe 14, provided with a cock $14^a$ and opening above the spiral conveyor 1 enables one to add the water necessary for remoistening the sand. Furthermore, fresh sand and binder are poured on the table 12 of the crushing device 13.

A regulating feeding scraper 15, placed obliquely at a point of the periphery of the table 12, causes the crushed sand to slide gradually onto a chute 16, whence it falls on a first belt conveyor 17, which is, for instance, made of rubber, and is actuated at a high speed. The surface of said conveyor is furnished with thin projecting plates 18 which drive the sand and throw it forward, in a very finely divided state, into a first chute 19 provided with a hood 20 intended to avoid losses of sand. During this sand throwing and owing to its very finely divided state and high speed, the sand undergoes a first and intensive cooling, as well as a marked breaking up.

This operation is repeated several times.

In the embodiment shown in Fig. 1, on coming out of chute 19, the sand immediately falls on a second conveyor belt 21, similar to belt 17, which throws it into a second chute 22, similar to chute 19 and likewise provided with a hood 23. The sand thus undergoes a second intensive cooling and a second breaking up. On coming out of said chute 22, the sand falls on a third conveyor belt 24 which may be actuated at a higher speed than belts 17 and 21 and/or be more steeply sloped so as to throw the sand, which has undergone a third intensive cooling and breaking up, into a bin 25 provided with a hood $25^a$ where it is collected in 26. The bin 25 bears at its base a trap-door 27 whence the sand flows towards the utilization station.

By passing over several successive conveyor belts with plates, said sand becomes completely divided and mixed, thus allowing the added water to filter through the grains and ensuring a rapid remoistening, uniform and thorough.

Furthermore, by repeated coolings which it undergoes while passing at high speed through the atmospheric air, the sand is brought down to a temperature sufficiently low to be immediately used again.

Bin 25 is no longer used for cooling and dampening of the sand but exclusively for its stocking, and its capacity is as low as the differences between the feeding and utilization rate will allow.

The embodiment described above therefore enables all the operations necessary for the regeneration of old sand, and the transport thereof from the regeneration station to the utilization station without making use of large bins nor important labour or a great quantity of sand.

The embodiment shown in Figs. 2 and 3 does not differ from the preceding one, except that the sand, instead of passing on several successive conveyor belts, passes several times on the same conveyor belt, while operating in closed circuit. On coming out of chute 16, the sand falls on belt 28 similar to the conveyor belt of the example of Fig. 1 but actuated at a high speed and inclined at a greater angle.

The sand is thrown forward at 29, according to arrow $f^3$, in a finely separated state and scattered in the form of a jet 30. The top part of said jet enters at 31 into a bin 32 provided at its base with a trap-door 33, whilst the bottom part of said jet does not reach the entrance of the bin; it is stopped by the wall of said bin and again falls at 34 into a rearwardly sloped chute. Said chute is divided into two branches 36 and 37 (Fig. 3) which pass on each side of the belt conveyor 28, and converge at their bottom outlet, at 38, above the base of said belt 28. The sand which has not entered the bin 31, again falls at 38 through said chute 35 on belt 28 according to arrows $f^4$ and $f^5$ whence it is again sprayed in jets as described above. On the contrary, the top portion of the sand jet having entered at 31 into the bin 32 accumulates at 39 and may be used again.

The sand throwing distance of belt 28 is regulated by varying its speed and/or its slope, so that only a third of the sand, for instance, enters the bin 32, the excess sand again falls on belt 28, the rate of which is multiplied by three with respect to the utilization rate due to the successive falls. Therefore, the sand accomplishes an average of two closed circuits in addition to its direct itinerary, thus undergoing a breaking up which ensures the desired dampening and cooling.

Owing to this arrangement, the sand conditioning plant is greatly simplified and its dimensions are particularly reduced, thus leading to very important savings concerning space taken up as well as manufacturing costs. The maintenance and power costs concerning only a very reduced number of very simple apparatus ensure very economical working of the plant. Furthermore, the use of labour is reduced to the supervision and maintenance of the appliance described.

According to the example shown in Fig. 4 the spraying apparatus is composed of a first belt with plates 40, of slow speed and little slope, which throws the sand on a second belt 41 more sloped than belt 40 and actuated at a higher speed. Said belt 41 throws the sand towards bin 32 in which it partly enters as hereinbefore described, the remaining sand falling again through the chute 35, similar to chutes 30 of Figs. 2 and 3, on the first belt 40 thus being replaced in a closed circuit.

This embodiment has the same advantages as those of the apparatus of Figs. 2 and 3. Furthermore, the shock caused by the first jet with the plates of the second belt enables a more nearly perfect breaking up, and the high speed reached by the sand after its journey on two consecutive belts, ensures to said sand a jet of a greater height, thus enabling, in the case of big volumes of storage, the doing away with any other elevational means.

The invention is, of course, not limited to the above described embodiments which have merely been given by way of examples. Thus in Figs. 2, 3 and 4, the means enabling the splitting up of the jet into two parts whereby one returns rearwardly, may naturally be embodied in any other manner. The number of circuits may embody any suitable number of closed cyclic paths.

Having now described my invention what I claim as new and desire to secure by Letters Patent is:

1. In a plant for conditioning moulding sand, the combination of a sloped conveyor device adapted to throw from its upper end a divergent aerial jet of sand, a storage bin located a relatively short distance from said upper end of said conveyor device but spaced therefrom, said storage bin having a front wall provided with an aperture therein and a rear wall and hood, and a sloped chute fitted to said front wall and opening at its lower end above the lower part of said conveyor device.

2. In a plant for conditioning moulding sand, the combination of a sloped conveyor adapted to throw from its upper end a divergent aerial jet of sand, a storage bin located a relatively short distance from said upper end of said conveyor but spaced therefrom, said storage bin having a front wall provided with an aperture therein and a rear wall and hood, and a sloped chute fitted to said front wall, said chute being formed of two branches which skirt said conveyor, the lower edge of each of said branches opening above the lower part of said conveyor device.

3. In a plant for conditioning moulding sand, the combination of a sloped endless conveyor belt adapted to throw from its upper end a divergent aerial jet of sand, a storage bin located a relatively short distance from said upper end of said belt but spaced therefrom, said storage bin having a front wall provided with an aperture therein and a rear wall and hood, and a sloped chute fitted to said front wall, said chute being formed of two branches which skirt said conveyor belt, the lower edge of each of said branches opening above the lower part of the upper face of said belt.

4. In a plant for conditioning moulding sand, the combination of two sloped endless conveyor belts in series, the second of said belts being adapted to throw from its upper end a divergent aerial jet of sand, a storage bin located a relatively short distance from said upper end of said second belt but spaced therefrom, said storage bin having a front wall provided with an aperture therein and a rear wall and hood, and a sloped chute fitted to said front wall, said chute being formed of two branches which skirt said second belt, the lower edge of each of said branches opening above the lower part of the upper face of the first of said belts.

JACQUES BOUCHER.

(References on following page)

REFERENCES CITED

The following references are of record in the file of this patent:

UNITED STATES PATENTS

| Number | Name | Date |
|---|---|---|
| 780,349 | Johnson | Jan. 17, 1905 |
| 1,559,916 | Royer | Nov. 3, 1925 |
| 1,912,837 | Goldberg | June 6, 1937 |
| 2,128,848 | Rafetto | Aug. 30, 1938 |
| 2,456,769 | Christensen | Dec. 21, 1948 |

FOREIGN PATENTS

| Number | Country | Date |
|---|---|---|
| 391,609 | Great Britain | May 4, 1933 |
| 513,516 | Germany | Oct. 25, 1928 |